United States Patent
Pandey et al.

(10) Patent No.: US 12,105,321 B2
(45) Date of Patent: Oct. 1, 2024

(54) MULTI-CORE FIBER AND MANUFACTURING METHOD THEREOF AND MULTI-CORE FIBER MARKER

(71) Applicant: Sterlite Technologies Limited, Gurugram (IN)

(72) Inventors: Anand Pandey, Gurugram (IN); Ranjith Balakrishnan, Gurugram (IN)

(73) Assignee: Sterlite Technologies Limited, Gurugram (IN)

( * ) Notice: Subject to any disclaimer, the term of this patent is extended or adjusted under 35 U.S.C. 154(b) by 64 days.

(21) Appl. No.: 17/698,796

(22) Filed: Mar. 18, 2022

(65) Prior Publication Data
US 2023/0204850 A1    Jun. 29, 2023

(30) Foreign Application Priority Data
Dec. 28, 2021    (IN) .............................. 202111061332

(51) Int. Cl.
*G02B 6/02*    (2006.01)
*G02B 6/44*    (2006.01)

(52) U.S. Cl.
CPC ..... *G02B 6/02042* (2013.01); *G02B 6/02338* (2013.01); *G02B 6/4482* (2013.01)

(58) Field of Classification Search
None
See application file for complete search history.

(56) References Cited

U.S. PATENT DOCUMENTS

2012/0087626 A1 *  4/2012  Nagashima ........ G02B 6/02042
                                                    385/124

FOREIGN PATENT DOCUMENTS

EP           3185055 B1 *  1/2021  ......... G02B 6/02042
WO    WO-2015133239 A1 *  9/2015  ....... C03B 37/01222

* cited by examiner

*Primary Examiner* — Chris H Chu
(74) *Attorney, Agent, or Firm* — Steven R. Fairchild

(57) ABSTRACT

The present disclosure provides a multi-core fiber (MCF) and manufacturing method thereof and an MCF marker (or marker). The MCF (100) comprises a plurality of cores (102) and a marker (108). Each core is associated with a core diameter (104) and a core-placement-radius (106) and the marker (108) is associated with a marker diameter (110) and a marker-placement-radius (112). The marker has a marker core (116) and a marker clad (118) with a D/d ratio between 5 to 20. During manufacturing, the MCF is drawn from a preform assembly (200) having a top hollow handle (202) with a handle thickness (114) attached on a top end of a glass preform (204) that has a plurality of core holes (206) and a marker hole (210), wherein the marker hole (210) is at least partially covered by the top hollow handle of the handle thickness (114).

5 Claims, 5 Drawing Sheets

MULTI-CORE FIBER AND MANUFACTURING METHOD THEREOF AND MULTI-CORE FIBER MARKER

TECHNICAL FIELD

The present disclosure relates to the field of optical fibers, and more particularly, relates to a multi-core fiber and manufacturing method thereof and a multi-core fiber marker.

BACKGROUND

Optical fiber cables are a critical component of a modern communication network across the globe. As the data and data rate requirements are increasing, more optical fibers are required in the network to support higher capacity, bandwidth and speed. One of the solutions to address the requirement of capacity, bandwidth and speed is multicore optical fibers (MCF) that pack multiple cores in a single fiber and increases transmission density of the single fiber.

A typical way of manufacturing an MCF is by using a rod-in-cylinder (RIC) method, in which holes are drilled in a cylindrical glass preform and then core rods and a marker rod are inserted in the holes. It is then collapsed to form an MCF glass preform, which is then drawn to manufacture the MCF.

Typically, the MCF has a small diameter marker that enables correct identification of individual cores for joining (splicing). Drilling a small diameter marker hole places severe drilling restrictions on the depth and accuracy of drilled holes.

One way to address this problem is to increase the marker hole size, which is restricted by technical limitations of the conventional RIC method. In the conventional RIC method, increase in the marker hole size causes decrease in thickness of a hollow handle, thereby compromising the strength of the hollow handle and limiting the weight the hollow handle can support and thus, limiting the size of the MCF glass preform and length of the MCF drawn.

Therefore, there is a need to address the above limitations.

Object of the Disclosure

A primary object of the present disclosure is to provide a multi-core fiber (MCF) and manufacturing method thereof and a multi-core fiber marker to identify an MCF core.

Another object of the present disclosure is to manufacture a marker drill hole diameter equal to an MCF core drill hole diameter, wherein D/d (diameter of clad to diameter of core) ratio of the MCF marker (or marker rod) is increased with increase in the marker drill hole diameter to reduce crosstalk between the MCF core and the MCF marker, wherein the MCF marker is inserted in a marker drill hole before handle attachment and closed partially while welding the handle.

SUMMARY

Accordingly, the present disclosure provides a multi-core fiber (MCF) and manufacturing method thereof and a multi-core fiber marker to identify an MCF core.

In an aspect, the multi-core fiber is manufactured by an RIC (Rod-in-Cylinder) technique, comprises a plurality of cores and a marker to identify the plurality of cores. Each core is associated with a core diameter and a core-placement-radius and the marker is associated with a marker diameter and a marker-placement-radius. The marker diameter is equal to a core diameter and the marker-placement-radius is different from the core-placement-radius. The marker has a marker core and a marker clad and defined by a D/d ratio (ratio of diameter of clad to diameter of core) between 5 to 20 that is greater than D/d ratio (ratio of diameter of clad to diameter of core) of each of the plurality of cores. The marker is doped with at least one of: up-dopant, down-dopant, colour dopant. A marker rod is inserted in a marker hole before joining a top hollow handle if a cladding area of the marker rod is less for the top hollow handle and the plurality of core rods are inserted in a plurality of core holes respectively after joining the top hollow handle i.e., only if sufficient space is not available for inserting marker rod into an MCF glass preform.

In another aspect, the method for manufacturing the MCF includes manufacturing an MCF glass preform and drawing the MCF glass preform to manufacture the multi-core fiber. The MCF glass preform is manufactured by drilling a plurality of core holes and a marker hole in a glass preform, wherein the plurality of core holes and the marker hole are identical in dimensions. Further, manufacturing of the MCF glass preform includes inserting a marker rod in the marker hole, joining, after inserting the marker rod, a top hollow handle at a top end of the glass preform such that a handle thickness at least partially covers the marker hole. The manufacturing of the MCF glass preform further includes inserting a plurality of core rods in the plurality of core holes to form a preform assembly and collapsing the preform assembly after the marker rod and the plurality of core rods are inserted. Accordingly, the MCF glass preform is drawn to manufacture the multi-core fiber.

In a few implementations, the method includes stretching the preform assembly prior to drawing and chamfering ends of each of the marker hole and the plurality of core holes.

These and other aspects herein will be better appreciated and understood when considered in conjunction with the following description and the accompanying drawing. It should be understood, however, that the following descriptions are given by way of illustration and not of limitation. Many changes and modifications may be made within the scope of the invention herein without departing from the spirit thereof.

BRIEF DESCRIPTION OF FIGURES

The invention is illustrated in the accompanying drawing, throughout which like reference letters indicate corresponding parts in the figure. The invention herein will be better understood from the following description with reference to the drawing, in which.

DETAILED DESCRIPTION

Figure 1:
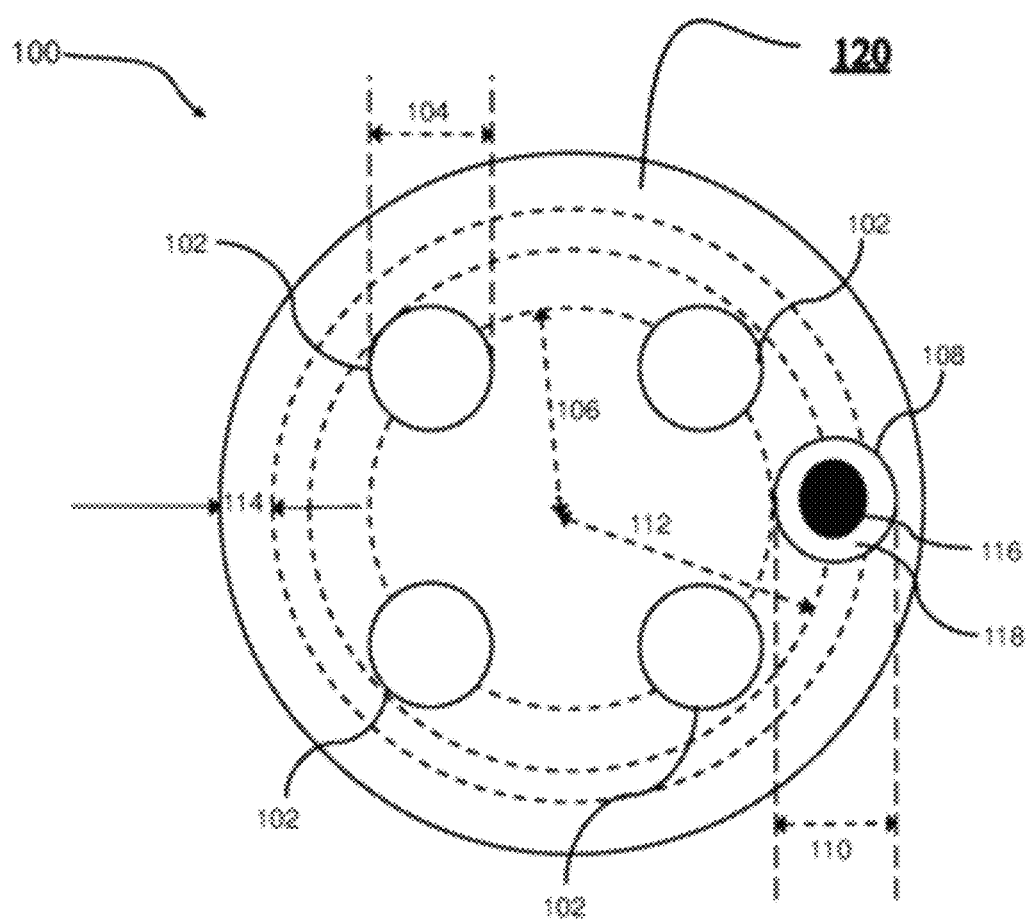
FIG. 1 is a cross-section of an MCF (multi-core fiber), according to the present disclosure.

In the following detailed description of the invention, numerous specific details are set forth in order to provide a thorough understanding of the invention. However, it will be obvious to a person skilled in the art that the invention may be practiced with or without these specific details. In other instances, well known methods, procedures and components have not been described in details so as not to unnecessarily obscure aspects of the invention.

Furthermore, it will be clear that the invention is not limited to these alternatives only. Numerous modifications, changes, variations, substitutions and equivalents will be apparent to those skilled in the art, without parting from the scope of the invention.

The accompanying drawing is used to help easily understand various technical features and it should be understood that the alternatives presented herein are not limited by the accompanying drawing. As such, the present disclosure should be construed to extend to any alterations, equivalents and substitutes in addition to those which are particularly set out in the accompanying drawing. Although the terms first, second, etc. may be used herein to describe various elements, these elements should not be limited by these terms. These terms are generally only used to distinguish one element from another.

The drawbacks mentioned earlier (in the background section) are overcome by the proposed disclosure that provides a multi-core fiber (MCF) and manufacturing method thereof and a multi-core fiber marker to identify an MCF core. Further, the present disclosure proposes manufacturing a marker drill hole diameter equal to an MCF core drill hole diameter, wherein D/d (diameter of marker clad to diameter of marker core) ratio of the MCF marker (or marker rod) is increased with increase in the marker drill hole diameter to reduce crosstalk between the MCF core and the MCF marker, wherein the marker rod is inserted in a marker drill hole before handle attachment if a cladding area of the marker rod is less for a top hollow handle and closed partially while welding the top hollow handle. Marker rod is having a core which is doped and a clad which is of same material like that of an optical fibre preform.

Referring now to the drawings, and more particularly to FIGS. 1 through 5.

FIG. 1 is a cross-section of an MCF (multi-core fiber) 100. The MCF 100 comprises a plurality of cores 102 and a marker 108 disposed in a glass cladding 120. Although in FIG. 1, four cores 102 and one marker 108 have been illustrated, however it is understood that the MCF 100 may have more or less number of cores and markers without limiting the scope of the present disclosure.

Each of the plurality of cores 102 has a core diameter 104 and a core-placement-radius 106. The marker (or marker rod) 108 has a marker diameter 110 and a marker-placement-radius 112 such that the marker diameter 110 is equal to the core diameter 104 and the marker-placement-radius 112 is different from the core-placement-radius 106. The marker 108 has a marker core 116 and a marker clad 118 and may be used to transmit light signals. The marker 108 is doped with at least one of an up-dopant, a down-dopant, a colour dopant.

The marker 108 may be doped with an up-dopant such as germanium and a colour dopant. Alternatively, the marker 108 may be doped with an up-dopant such as germanium, with traces of a down-dopant such as fluorine and a colour dopant. There could be other combination of an up-dopant, a down-dopant and a colour dopant possible for the marker 108. Alternatively, the marker 108 and the plurality of cores 102 may use the same combination of an up-dopant, a down-dopant and a colour dopant. Alternatively, the marker 108 and the plurality of cores 102 may use the same combination of an up-dopant, a down-dopant, a colour dopant, and an undoped region.

In an aspect of the present disclosure, each of the marker 108 and the plurality of cores 102 have a first D/d ratio of 5-20 such that the first D/d ratio of the marker 108 is higher than a second D/d ratio of each of the plurality of cores 102, where the second D/d ratio is a ratio of diameter of clad portion to diameter of core portion of the plurality of core 102. The second D/d ratio is designed based on a waveguide design profile. The first D/d ratio of the marker 108 can be decided for identification of the plurality of cores 102.

Figure 2:
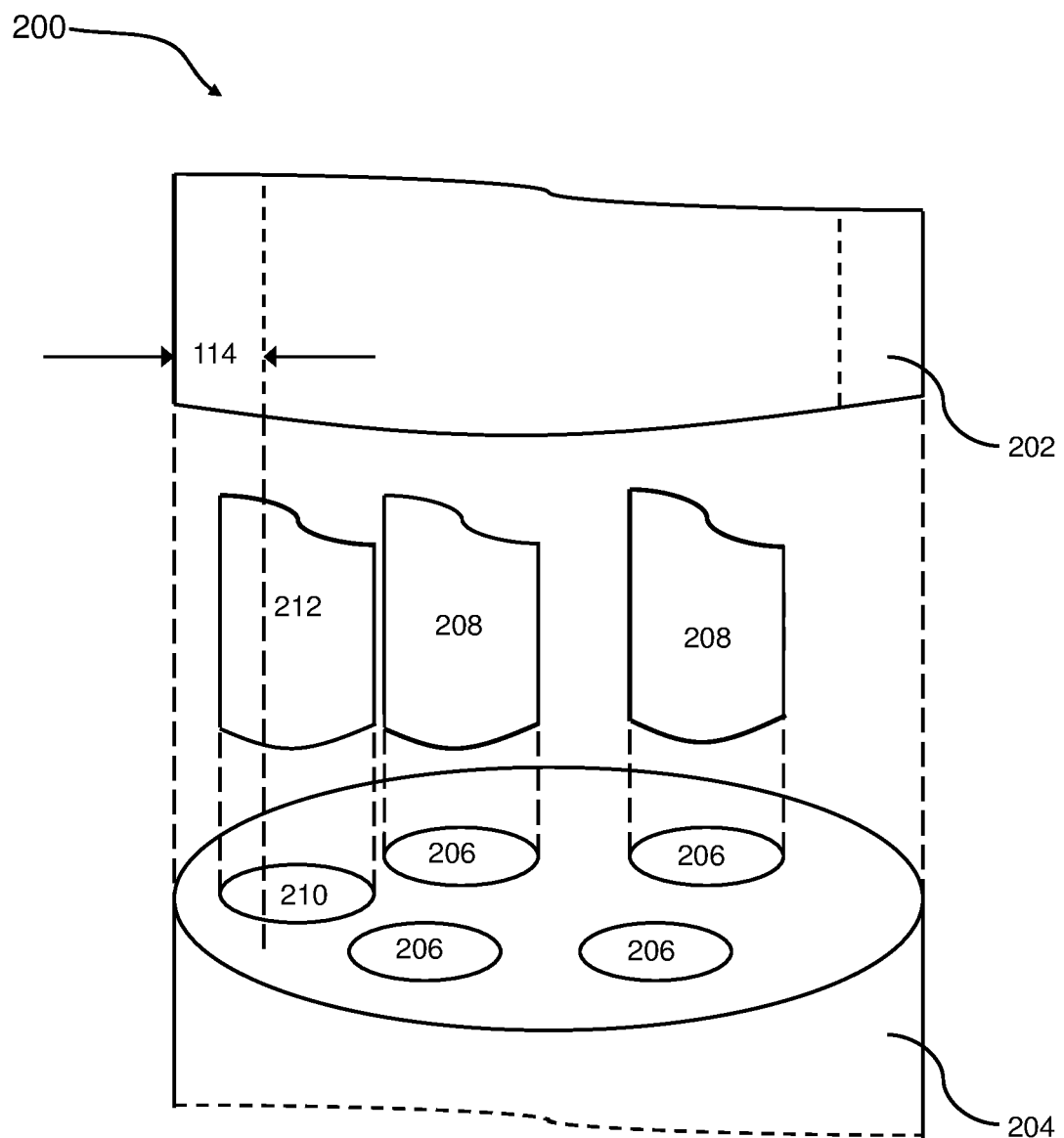
FIG. 2 illustrates a front view of an MCF preform assembly.

FIG. 2 illustrates a front view of an MCF preform assembly 200. The MCF preform assembly (or preform assembly) 200 comprises a plurality of core holes 206 and a marker hole 210 drilled into a glass preform (or MCF glass preform) 204. The plurality of core holes 206 and the marker hole 210 may be identical in dimensions such as diameter. A plurality of core rods 208 and a marker rod 212 are inserted into the plurality of core holes 206 and the marker hole 210 respectively. For illustration purposes, only a few core rods have been shown in FIG. 2.

In an aspect of the present disclosure, ends of each of the marker hole 210 and the plurality of core holes 206 are chamfered. Chamfering may be done to avoid shrinkage of a diameter of the marker hole 210 and the plurality of core holes 206 during joining a top hollow handle (interchangeably "top handle") 202. The MFC preform assembly 200 is then collapsed/fused after insertion of the marker rod 212 and the plurality of core rods 208, causing formation of a monolith structure. During collapsing, the MFC preform assembly 200 may be heated at a high temperature, such as more than 2000° C.

In an aspect of the present disclosure, the glass preform 204 can be stretched in a heated environment that may help reducing structural defects in the glass preform 204. The glass preform 204 is then drawn to manufacture the multi-core fiber 100.

The MCF preform assembly 200 further comprises the top hollow handle 202 with a handle thickness 114 attached on a top end of the glass preform 204 that has the plurality of core holes 206 corresponding to the plurality of core rods 208 and the marker hole 210 corresponding to the marker rod 212 as explained above. The top hollow handle 202 of the handle thickness 114 is joined at the top end of the glass preform 204 after insertion of the marker rod 212. The marker hole 210 is at least partially covered by the top hollow handle 202 of the handle thickness 114.

Figure 3:
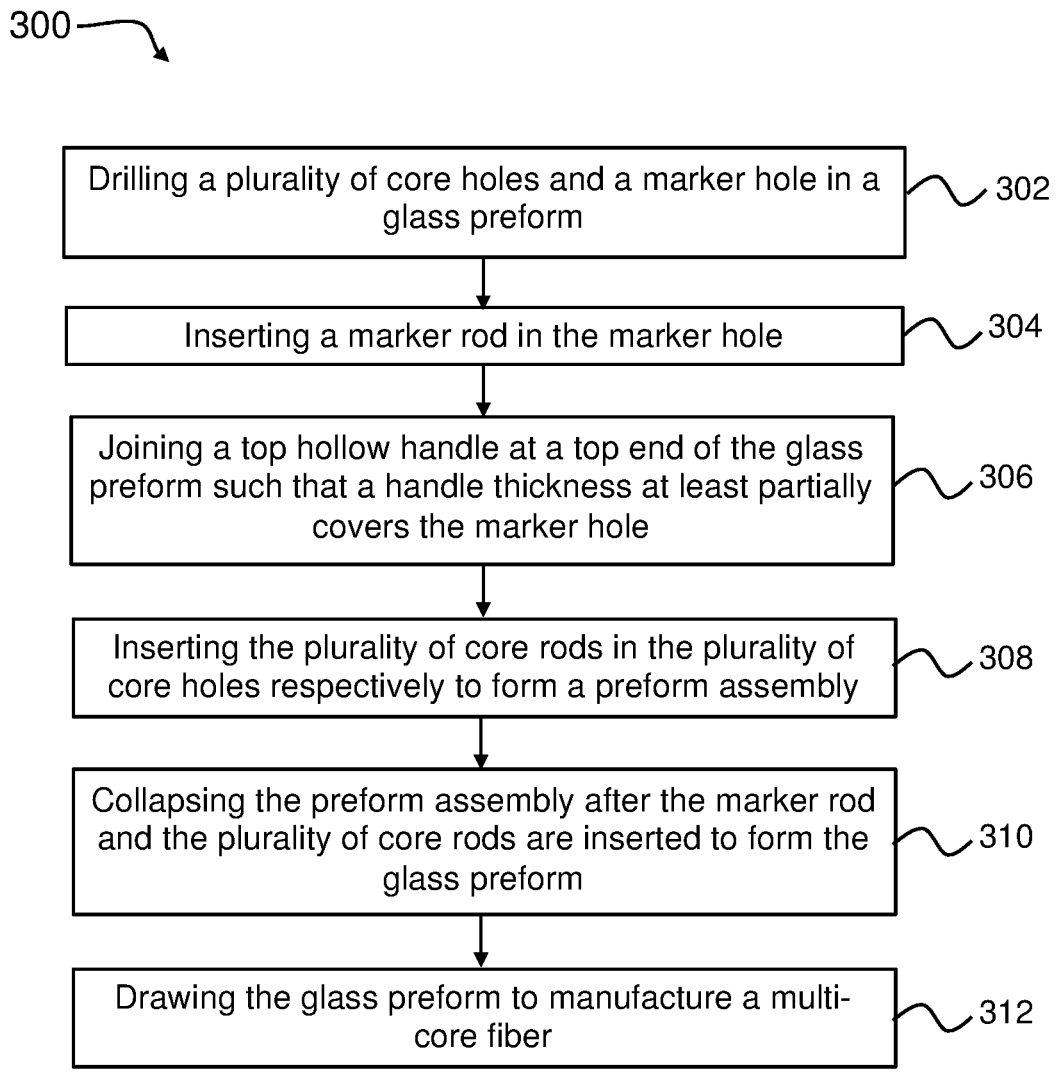
FIG. 3 is a flowchart illustrating a method of manufacturing the MCF.

FIG. 3 is a flowchart 300 illustrating a method of manufacturing the MCF 100. It may be noted that in order to explain method steps, references will be made to FIG. 1 and FIG. 2. The MCF 100 may be manufactured by manufacturing the glass preform and drawing the glass preform.

The glass preform 204 manufacturing comprises drilling the plurality of core holes 206 and the marker hole 210 in the glass preform 204 at step 302, wherein the plurality of core holes 206 and the marker hole 210 are identical in dimensions. At step 304, the method includes inserting the marker rod 212 in the marker hole 210. After inserting the marker rod 212, at step 306, the method includes joining the top hollow handle 202 at the top end of the glass preform 204 such that the handle thickness 114 at least partially covers the marker hole 210. At step 308, the method includes inserting the plurality of core rods 208 in the plurality of core holes 206 respectively to form the preform assembly 200. Thereafter, the method, at step 310, includes collapsing the preform assembly 200 after the marker rod 212 and the plurality of core rods 208 are inserted to form the glass preform 204. After collapsing, at step 312, the glass preform 204 can be drawn to manufacture the multi-core fiber 100.

Figure 4:
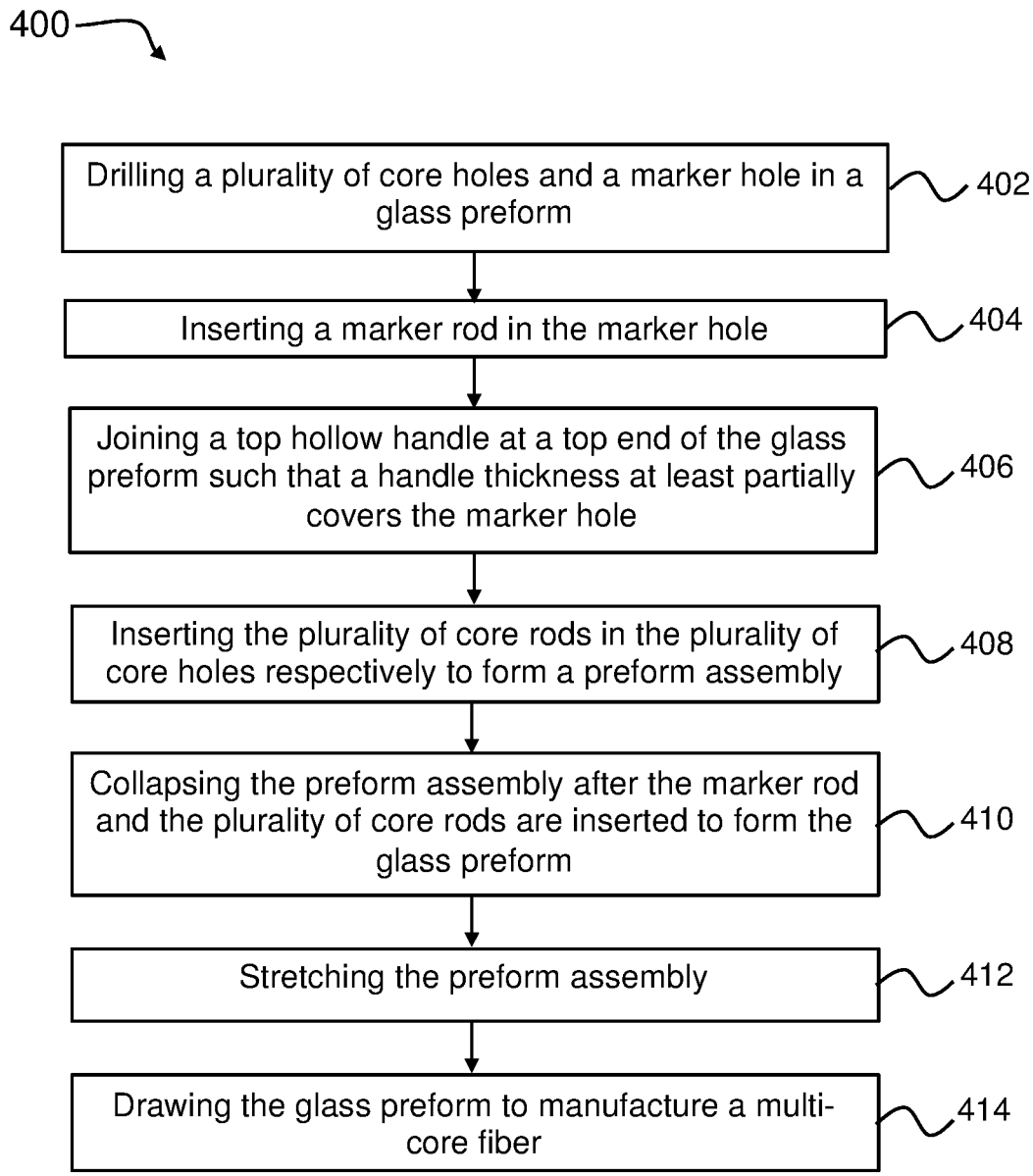
FIG. 4 is a flowchart illustrating a method of manufacturing the MCF.

FIG. 4 is a flowchart 400 illustrating a method of manufacturing the MCF 100. It may be noted that in order to explain method steps, references will be made to FIG. 1 and FIG. 2. The MCF 100 may be manufactured by manufacturing the glass preform 204 and drawing the glass preform 204.

The glass preform 204 manufacturing comprises drilling the plurality of core holes 206 and the marker hole 210 in the glass preform 204 at step 402, wherein the plurality of core holes 206 and the marker hole 210 are identical in dimensions. At step 404, the method includes inserting the marker rod 212 in the marker hole 210. After inserting the marker rod 212, at step 406, the method includes joining the top hollow handle 202 at the top end of the glass preform 204 such that the handle thickness 114 at least partially covers the marker hole 210. At step 408, the method includes inserting the plurality of core rods 208 in the plurality of core holes 206 respectively to form the preform assembly 200. The method, at step 410, includes collapsing the preform assembly 200 after the marker rod 212 and the plurality of core rods 208 are inserted to form the glass preform 204 and at step 412, the method includes stretching the preform assembly 200. After collapsing and stretching, at step 414, the glass preform 204 can be drawn to manufacture the multi-core fiber 100.

Figure 5:
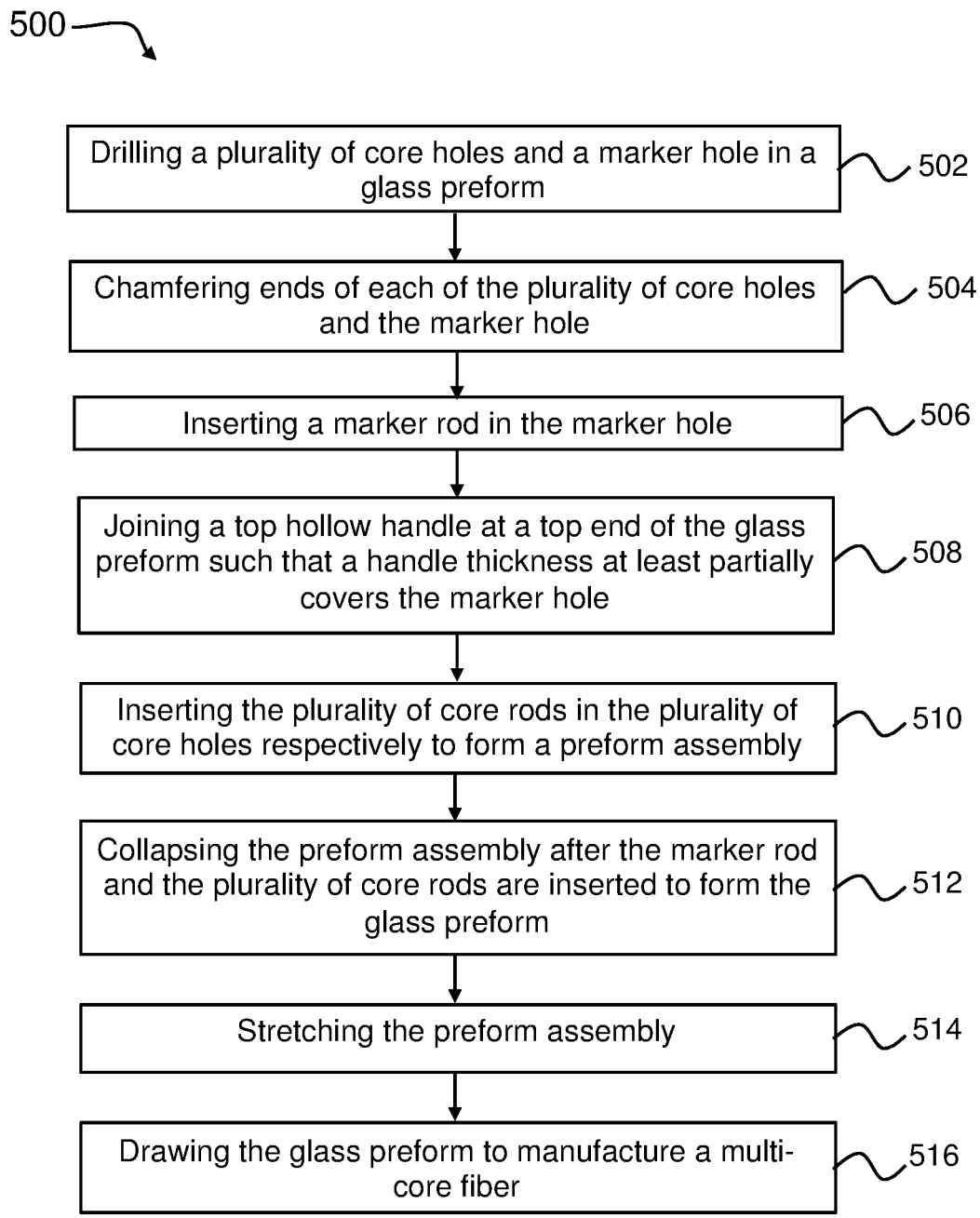
FIG. 5 is a flowchart illustrating a method of manufacturing the MCF.

FIG. 5 is a flowchart 500 illustrating a method of manufacturing the MCF 100. It may be noted that in order to explain method steps, references will be made to FIG. 1 and FIG. 2. The MCF 100 may be manufactured by manufacturing the glass preform 204 and drawing the glass preform 204.

The glass preform 204 manufacturing comprises drilling the plurality of core holes 206 and the marker hole 210 in the glass preform 204 at step 502, wherein the plurality of core holes 206 and the marker hole 210 are identical in dimensions. At step 504, the method includes chamfering ends of each of the plurality of core holes 206 and the marker hole 210. At step 506, the method includes inserting the marker rod 212 in the marker hole 210. After inserting the marker rod 212, at step 508, the method includes joining the top hollow handle 202 at the top end of the glass preform 204 such that the handle thickness 114 at least partially covers the marker hole 210. At step 510, the method includes inserting the plurality of core rods 208 in the plurality of core holes 206 respectively to form the preform assembly 200. The method, at step 512, includes collapsing the preform assembly 200 after the marker rod 212 and the plurality of core rods 208 are inserted to form the glass preform 204 and at step 514, the method includes stretching the preform assembly 200. After collapsing and stretching, at step 516, the glass preform 204 can be drawn to manufacture the multi-core fiber 100.

The various actions, acts, blocks, steps, or the like of the flowcharts 300, 400, 500 may be performed in the order presented, in a different order or simultaneously. Further, in some implementations, some of the actions, acts, blocks, steps, or the like may be omitted, added, modified, skipped, or the like without departing from the scope of the invention.

Conditional language used herein, such as, among others, "can," "may," "might," "may," "e.g.," and the like, unless specifically stated otherwise, or otherwise understood within the context as used, is generally intended to convey that certain alternatives include, while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others. It is intended that the specification and examples be considered as exemplary, with the true scope of the invention being indicated by the claims.

What is claimed is:

1. A multi-core fiber (MCF) (100) comprising:
a plurality of cores (102), wherein each core is associated with a core diameter (104) and a core-placement-radius (106); and
a marker (108), wherein the marker (108) is associated with a marker diameter (110) and a marker-placement-radius (112), wherein the marker diameter (110) is equal to a core diameter (104), wherein the marker-placement-radius (112) is different from the core-placement-radius (106), wherein the marker (108) has a marker core (116) and a marker clad (118), wherein a first ratio of the clad diameter to core diameter of the marker (108) is greater than a second ratio of clad diameter to core diameter of the plurality of cores (102).

2. The multi-core fiber (100) as claimed in claim 1, wherein the first ratio of the marker clad (118) to the marker core (116) is in a range of 5 to 20.

3. The multi-core fiber (100) as claimed in claim 1, wherein the marker (108) is doped with at least one of an up-dopant, a down-dopant, and a colour dopant.

4. The multi-core fiber (100) as claimed in claim 1, wherein the marker (108) is used to transmit light signals.

5. The multi-core fiber (100) as claimed in claim 1, wherein the marker clad (118) and outer clad (120) are made of same material.

* * * * *